United States Patent [19]

Jeong-Hun

[11] Patent Number: 5,097,671
[45] Date of Patent: Mar. 24, 1992

[54] AIR CONDITIONER

[75] Inventor: An Jeong-Hun, Kyonggi, Rep. of Korea

[73] Assignee: Samsung Electronics Co., Ltd., Rep. of Korea

[21] Appl. No.: 724,154

[22] Filed: Jul. 1, 1991

[30] Foreign Application Priority Data

Jul. 5, 1990 [KR] Rep. of Korea .................. 90-10187

[51] Int. Cl.$^5$ ............................................. F25B 49/00
[52] U.S. Cl. ..................................... 62/126; 62/228.4; 236/51; 236/94
[58] Field of Search .................... 236/51, 94; 62/228.4, 62/126; 165/11, 1

[56] References Cited

U.S. PATENT DOCUMENTS

| | | | |
|---|---|---|---|
| 4,815,657 | 3/1989 | Tsukuda | 236/47 |
| 4,829,779 | 5/1989 | Munson et al. | 236/51 |
| 4,898,230 | 2/1990 | Tsuchiyama et al. | 236/94 X |
| 4,997,029 | 3/1991 | Otsuka et al. | 165/11.1 |

FOREIGN PATENT DOCUMENTS 64-75837 3/1989 Japan .

Primary Examiner—William E. Wayner
Attorney, Agent, or Firm—Burns, Doane, Swecker & Mathis

[57] ABSTRACT

An air conditioner which can be controlled remotely having a compressor capable of changing the number of rotations in response to a variation of frequency. The air condition includes a first sensor circuit section arranged in outdoor machinery, a second sensor circuit section arranged in indoor machinery, an operative state sensing section for receiving the output signals of the first and second sensor circuit sections and sensing the operating state of the air conditioner. The air conditioner further includes an LED display section for receiving the output signal of the operative state sensing section and displaying the operating state under control of the first microcomputer, and a first signal transmitting circuit section for transmitting a signal to a remote controller in accordance with the sensed operating state signal under control of the first microcomputer. The remote controller includes an LCD display section for receiving the transmitted signal from the first signal transmitting circuit section and displaying the circuit condition and the operating state under control of a second microcomputer.

6 Claims, 2 Drawing Sheets

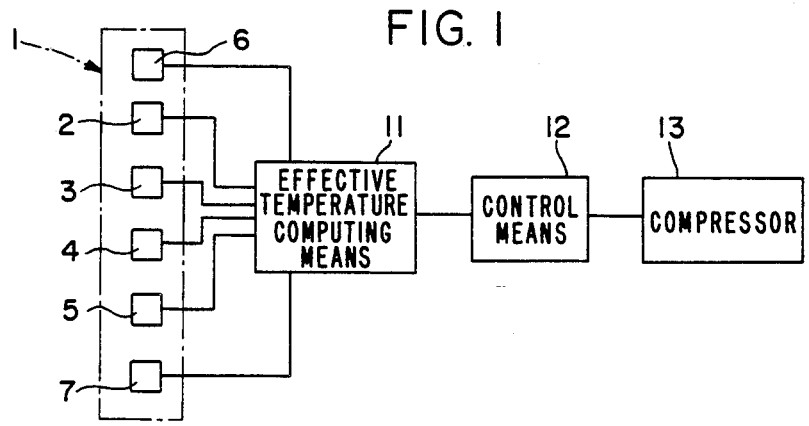
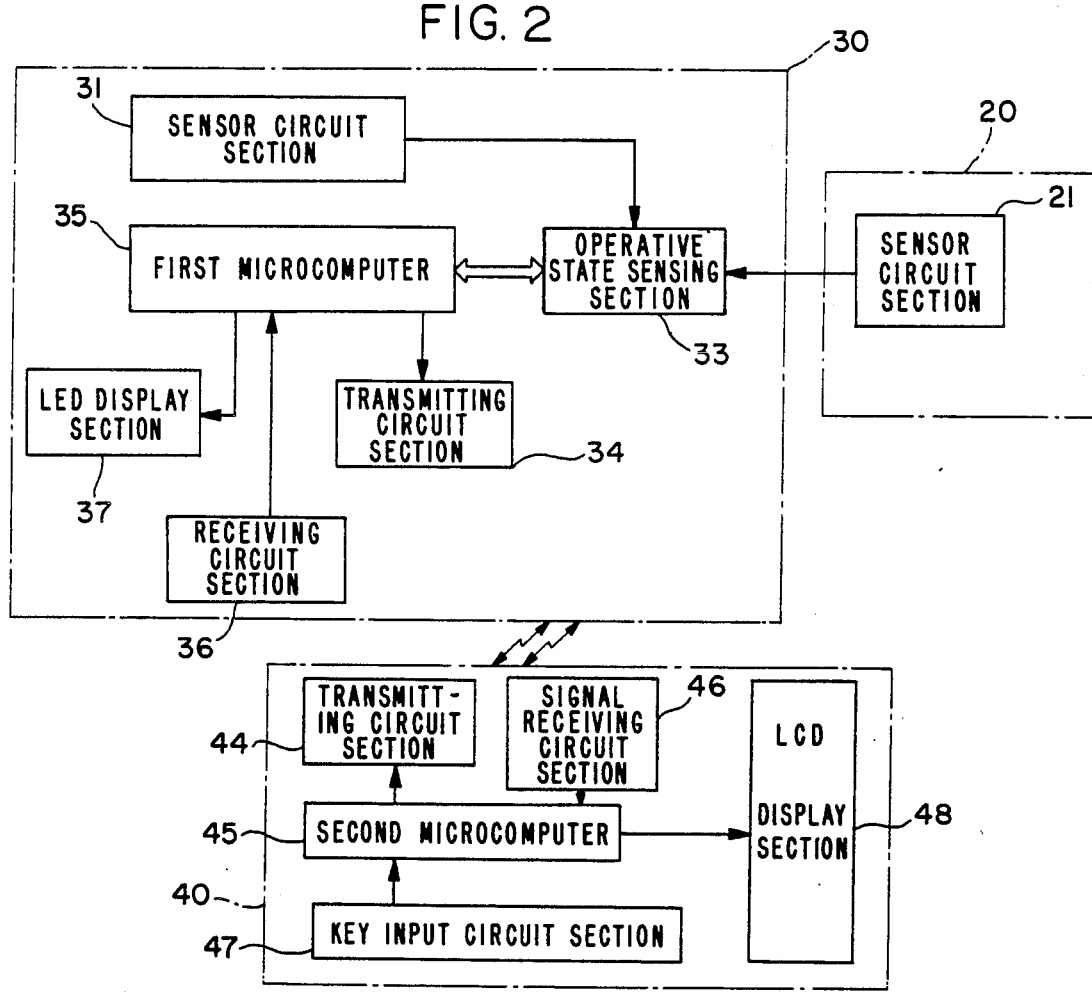

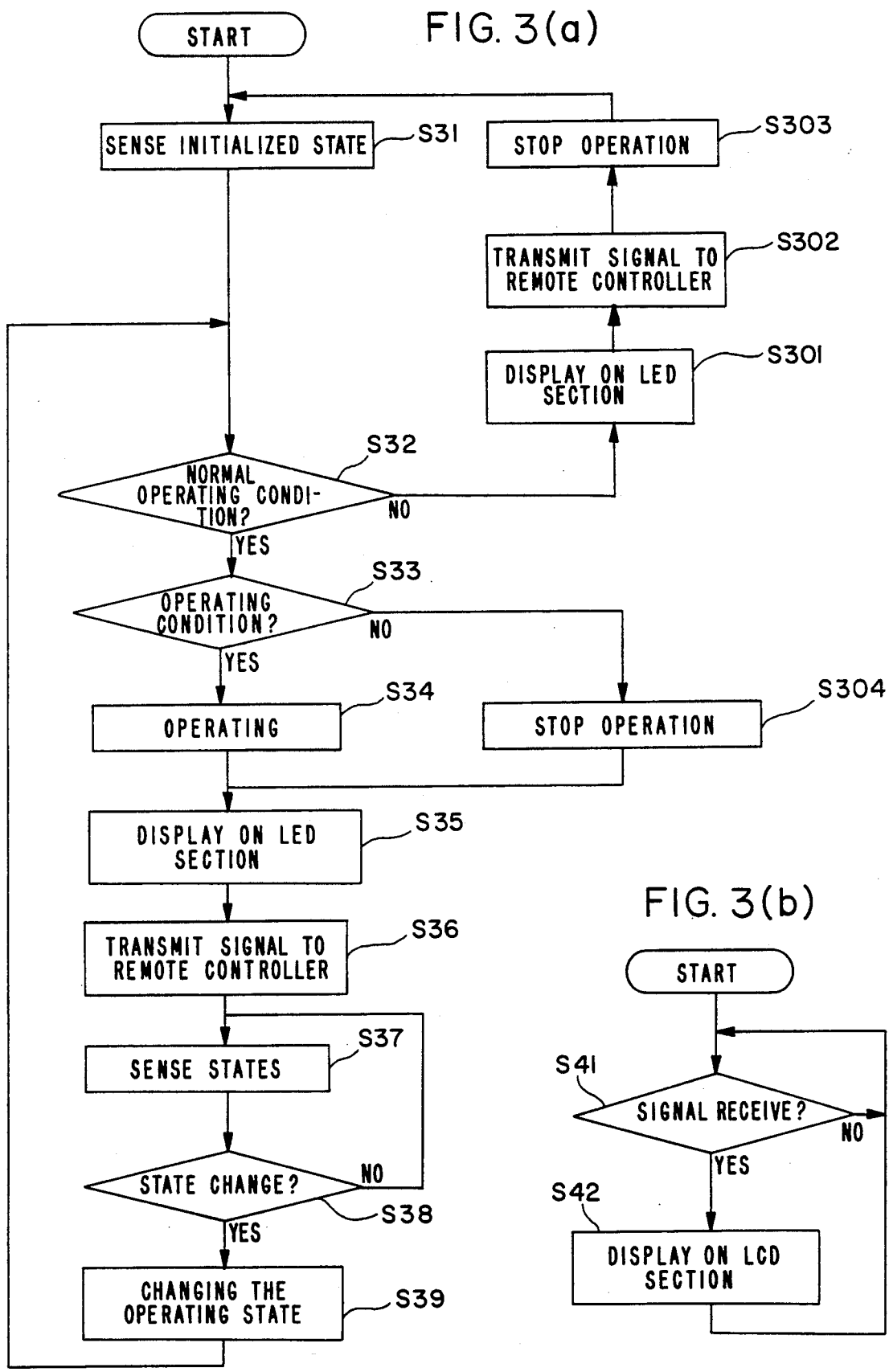

AIR CONDITIONER

BACKGROUND OF THE INVENTION

1. Field of the Invention

The present invention relates to an air conditioner which can be controlled remotely by means of a remote controller.

2. Description of the Prior Art

This kind of a typical air conditioner is disclosed, for example, in U.S. Pat. No. 4,815,657 proposed by Hiroshi Tsukuda. In this U.S. patent publication is described a room temperature controlling apparatus used for an air conditioner including a thermistor for detecting room temperature; a variable resistor for setting a room reference temperature for a room to be controlled; a pyroelectric infrared sensor for sensing human action and outputting human-sensed signal; a room temperature changing circuit for changing room temperature on the basis of the human-sensed signal supplied from the pyroelectric infrared sensor so that when human actions are detected, temperature is variable within wide limits; and, and a comparator for comparing the room temperature changed by the room reference temperature changing circuit with the reference temperature set by the variable resistor and for outputting the compared output to control operations of the air conditioner. With the structure, since room temperature is changeable in accordance with human action, it is possible to perform air cooling or heating to a condition suitable to the human action.

A differential kind of a conventional air conditioner is disclosed in Japanese Laid-Open Patent Publication Sho 64-75837. In this Japanese publication, as shown in FIG. 1 is described a control system of an air conditioner for controlling a compressor 13 of the air conditioner capable of air cooling and heating including: wireless remote control type operator 1 having a room temperature sensor 2, a humidity sensor 4, a wind velocity sensor 3 and a radiant heat sensor 5; and input 6 for instructing air cooling operation or heating operation; effective temperature computing circuit 11 for operating the sensors 2, 4 and 5 when it has received a signal indicative of air cooling operation from the input 6 and computing effective temperature "T set" in air cooling depending on the output signals from the sensors 2, 4 and 5 and for operating the sensors 2, 3 and 5 when it has received a signal indicative of heating operation from the input 6 and computing effective temperature "T set" in heating; and, a control for controlling the operation of the compressor 13 in accordance with the difference between effective temperature "T set" in air cooling or heating computed by the effective temperature computing circuit 11 and effective temperature "T set" previously by the setting mechanism 7.

Further, according to the aforementioned controlling apparatus, when temperature of a plumbing which connects indoor and outdoor machinery of the air conditioner departs from a prescribed temperature and temperature of the compressor also is raised due to overload and so on, it indicates the operation of stand-by status until the temperature is controlled appropriately.

In the controlling apparatus constructed as described above, meaning of the aforementioned stand-by status is that operation of the air conditioner will be returned to normalcy with the lapse of time. But, an operator cannot determine whether or not the apparatus is out-of-order since the operator cannot catch precisely the meaning of stand-by status. Accordingly, the operator may reattempt to operate the air conditioner, thereby causing a problem that the air conditioner will be operated ineffectively.

Also, if the circuit elements of the apparatus are defective, the apparatus operation is stopped and the trouble status is indicated by means of an LED. At this time, it has to turn off a main power switch of the air conditioner and then the apparatus must be repaired through A/S center. Nevertheless, the operator reattempts to operate the air conditioner since the operator cannot know precisely the cause that stopped the air conditioner in operation, but the air conditioner is inoperative entirely. Under this condition, if the operator attempts to operate the air conditioner, it is possible to damage the air conditioner itself due to defective elements and to cause a fire in a case where the elements are damaged seriously.

SUMMARY OF THE INVENTION

Accordingly, the present invention has been made in consideration of the above problems and an object of the present invention is to provide an air conditioner which an operator can easily know the operating state thereof.

Another object of the present invention is to provide an air conditioner which allows improved reliability and efficiency thereof.

To achieve the above objects, the air conditioner of the present invention has a compressor in which the number of rotations is changed according to a variation of frequency, and a remote controller for controlling remotely the air conditioner. The air conditioner includes a key input circuit section arranged in the remote controller and inputting user's control instruction; a second microcomputer receiving the user's control instruction inputted from the key input circuit section; a second transmitting circuit section for transmitting the control instruction inputted from the key input circuit section under control of the second microcomputer; a receiving circuit section for receiving the control instruction transmitted from the second transmitting circuit section and outputting the received control instructions; first and second sensor circuit sections arranged in indoor and outdoor machinery respectively and sensing the actual operating state and the circuit conditions.

The present invention further includes an operative state sensing section for receiving the output signals of the first and second sensor circuit sections and sensing the operating state. A first microcomputer is provided for receiving the user's control instruction from the receiving circuit and outputting the control instruction to the operative state sensing section and for receiving the output signal from the operative state sensing section and determining the circuit condition and the operating state of the first and second sensor circuit sections. A first display means is provided for the circuit condition and the operating state of the sensor circuit sections under control of the first microcomputer. The present invention also includes a first signal to a remote controller according to the sensed operating state signal under control of the first microcomputer, and a second display means for receiving the transmitted signal from the first signal transmitting circuit and displaying the circuit condition and the operating state under control of the second microcomputer.

BRIEF DESCRIPTION OF THE DRAWINGS

FIG. 1 is a schematic block diagram of a controlling apparatus of the conventional air conditioner;

FIG. 2 is a block diagram of a control circuit of an air conditioner according to the present invention;

FIG. 3(a) is a flowchart illustrating a control sequence of an indoor machinery in an air conditioner according to the present invention; and FIG. 3(b) is a flowchart illustrating a control sequence of a remote controller according to an air conditioner of the present invention

DESCRIPTION OF THE PREFERRED EMBODIMENT

The preferred embodiment of the present invention will now be described with reference to the accompanying drawings.

Referring to FIG. 2, numerical reference number 20 indicates outdoor machinery, which is provided with a sensor circuit section 21, a compressor (not shown), an outer fan (not shown) and so on. Indoor machinery 30 comprises a second sensor circuit section 31, an operative state sensing section 33 for receiving the output signals relative to the state of an air conditioner from the first sensor circuit section 21 arranged in the outdoor machinery, and the second sensor circuit section 31 arranged in the indoor machinery 30 and sensing the operating state of the air conditioner.

The air conditioner also includes a first microcomputer 35 for determining the circuit conditions and operating states of the sensor circuit sections 21 and 31 in the indoor and outdoor machinery 30 and 20 according to the output signals of the operative state sensing section 33, a LED display section 37 for displaying the circuit condition and operating state determined by the first microcomputer 35, a signal transmitting circuit section 34 for transmitting a signal so as to display the circuit condition and operating states determined by the first microcomputer 35 on a LCD display section of a remote controller which will be described later and a receiving circuit section 36 for receiving the transmitted signal from the transmitting circuit section 35 arranged in the remote controller and inputting user's instruction signal to the first microcomputer 35.

Furthermore, in FIG. 2, reference number 40 indicates a remote controller for controlling remotely the air conditioner, which comprises a key input circuit section 47 for inputting the user's instruction, a signal receiving circuit section 46 for receiving the circuit conditions and the operating state signals of the first and second sensor circuit sections 21 and 31 determined by the first microcomputer 35 in the indoor machinery 30 from the transmitting circuit section 34. The remote controller 40 further includes a second microcomputer 45 for receiving the output signals of the key input circuit section 47 and the signal receiving circuit section 46 and for determining the circuit conditions and the operating states of the indoor and outdoor machinery 30 and 20. The remote controller 40 also includes an LCD display section 48 for displaying in characters or symbols the output signal of the second microcomputer 45, and a transmitting circuit section 44 for transmitting the input instruction of the key input circuit section 47 under control of the second microcomputer 45.

Next, operation of the air conditioner according to the present invention constructed as described above will be described.

First, if power is supplied to the air condition, that is, if a power switch is turned ON and then user's instruction is selected and inputted a kind of control of the air conditioner to be operated from the key input circuit section 47 in the remote controller, the selected user's instruction is transmitted to the receiving circuit 36 of the indoor machinery 30 from the transmitting circuit 44 under control of the second microcomputer 45. If so, the operative state sensing section 33, arranged in the indoor machinery 30 which is controlled by the first microcomputer 35, senses the actual state of the air conditioner from the first and second sensor circuit sections 21 and 31 in the outdoor and indoor machinery 20 and 30 and inputs the state-sensed signal to the first microcomputer 35. At this time, the first microcomputer 35 checks the input signal from the operative state sensing section 33, determines whether the circuit conditions and the operating states of the outdoor and indoor machinery 20 and 30 are normal, and then controls the display of the determined results on the LED display section 37. Simultaneously the first microcomputer 35 transmits the determined result through the signal transmitting circuit section 34 to the signal receiving circuit section 46 in the remote controller 40. If the signal receiving circuit section 46 receives the signal from the signal transmitting circuit section 34, information relative to the circuit condition and the operating state are displayed in characters or symbols on the LCD display section 48 in the remote controller 40 under control of the second microcomputer 45.

Meanwhile, if room temperature is varied as the air conditioner is operated, variations of temperature of the outdoor and indoor machinery 20 and 30 are sensed and the varied state of temperature is displayed on the LED display section 37 in the indoor machinery 30. If the signal relative to the varied state of temperature is received by the signal receiving circuit section 46, the operating state of the air conditioner is displayed in characters or symbols under the second microcomputer 45 arranged in the remote controller 40.

Now, a control sequence of the air conditioner according to the present invention will be described with reference to FIG. 3(a) and (b), in which reference mark "S" denotes step.

Firstly, if the power switch, not shown, arranged in the key input circuit 47 of the controller 40 is turned on so as to supply power to the air conditioner, operation of the air conditioner is started and then the initialized state of the air conditioner is detected at step S31.

Next, if user's instruction is inputted from the key input circuit section 47, the instruction is transmitted from the transmitting circuit section 44 to the receiving circuit section 36 of the indoor machinery 30 under control of the second microcomputer 45 at step S32. Depending on the signal transmitted from the remote controller 40, the first microcomputer 35 determines whether the circuit condition and the operating states of the first and second sensor circuit sections 21 and 31, each being arranged in the indoor and outdoor machinery, are normal. As a result, if the sensor circuit sections are in a normal condition, that is, if YES, the processing proceeds to step S33. Herein normal operating condition means that the air conditioner is operating under the conditions which connection between the indoor machinery and the outdoor machinery is good and defective elements are not detected. At this step S33, it is determined whether the operating condition is performing in the normal operating condition. If the result is the operating condition, that is, if YES, the processing proceeds to step S34. At step S34, the actual operating state is still maintained and the operating state is displayed on the LED display section 37 arranged in the indoor machinery 30 as indicated at step S35. Also, a signal relative to the operating state is transmitted from the transmitting circuit section 34 to the signal receiving circuit section 46 to display the circuit condition and the operating state on the LCD display section 48 under control of the second microcomputer 45 as indicated at step S36. After that, the processing proceeds to a step 37 and the circuit condition and the operating state are checked in the same manner as described above at step S31. Next, the processing proceeds to a step S38 and the first microcomputer 35 determines whether or not the operating state has to change. If the determined result is YES, the processing proceeds to a step S39 and thus the user changes the operating state by using the key input circuit section 47 in the remote controller 40. Subsequently, the processing proceeds to step S32 and the first microcomputer performs repeatedly operations below step S32 to determine whether the air conditioner is operated normally according to the changed operating state.

Meanwhile, if the result is NO at step S38, the processing returns to step S37 and operations below step S37 are performed repeatedly.

Also, if it is not in the normal operating state, that is, if the result is NO at step S32, the processing proceeds to step S301. At step S301, the abnormal operating state is displayed on the LED display section 37 arranged in the indoor machinery 30 and then the processing proceeds to a step S302 where the abnormal operating state is transmitted to the remote controller 40 to display the abnormal state on the LCD display unit 37 in the remote controller 40. Subsequently, the processing proceeds to step S303 to stop the operation of the air conditioner and then the processing return to step S31 to perform repeatedly operations below step S31 according to the subsequent user's instruction.

Alternatively, if the result is NO at step S33, that is, if it is determined that a poor connection exists between the indoor and outdoor machinery and/or that the air conditioner is inoperable, depending on the defectiveness of the elements, the processing proceeds to step S304 to stop the air conditioner and then the processing proceeds to step S35 to perform repeatedly operations below step S35.

Referring to FIG. 3(b), if power is supplied by pressing a power switch, now shown, arranged in the remote controller 40, the remote controller 40 is started in operation and then the processing proceeds to step S41 to determine whether or not the signal transmitted at steps S36 and S302 in FIG. 3(a) is received at step S41. If the signal is transmitted, that is, if YES, the processing proceeds to step S42 and then the state related to the received signal is display on the LCD display section 48. After that, the processing returns to step S41 and then operations below step S41 are repeatedly performed.

Alternatively, the signal is not received at step S41, operations are returned to the initial step.

According to the air conditioner of the present invention, as described above, since user can know precisely the actual operating state of the air conditioner, it prevents the air conditioner from unnecessary reoperation. In addition, although a defect is occurred in the air conditioner, since it is possible to take necessary action without delay, thereby achieving excellent effects that the operations are improved and a fire due to reoperation of a defective air conditioner is prevented.

Although a certain preferred embodiment of the present invention has been shown and described, it should be understood that many changes and modifications may be made therein without departing from the scope of the appended claims.

What is claimed is:

1. An air conditioner having a compressor in which the number of rotations thereof is changed according to a variation of frequency and a remote controller for remotely controlling the air conditioner comprising:

a key input circuit section, arranged in the remote controller, for inputting user's control instruction;

a second microcomputer receiving the user's control instruction inputted from the key input circuit section;

a second transmitting circuit section for transmitting the control instruction inputted from the key input circuit section under control of the second microcomputer;

a receiving circuit section for receiving the control instruction transmitted from the second transmitting circuit section and outputting the received control instructions;

first and second sensor circuit sections, arranged in indoor and outdoor machinery, respectively, for sensing the actual operating state and the circuit conditions;

an operative state sensing section for receiving the output signals of the first and second sensor circuit sections and sensing the operating state;

a first microcomputer for receiving the user's control instruction from the receiving circuit and outputting the control instruction to the operative state sensing section and for receiving the output signal from the operative state sensing section and determining the circuit condition and the operating state of the first and second sensor circuit sections;

a first display means for displaying the circuit condition and the operating state of the sensor circuit sections under control of the first microcomputer;

a first signal transmitting circuit section for transmitting a signal to a remote controller according to the sensed operating state signal under control of the first microcomputer; and second display means for receiving the transmitted signal from the first signal transmitting circuit and for displaying the circuit condition and the operating state under control of the second microcomputer.

2. An air conditioner according to claim 1, wherein said operative state sensing section receives the output signals of the first and second sensor circuit sections arranged in the outdoor and indoor machinery to sense the respective operating states.

3. An air conditioner according to claim 1, wherein said first displaying means comprises an LED displaying section arranged in the indoor machinery.

4. An air conditioner according to claim 1, wherein said second displaying means is an LED displaying section for displaying in characters or symbols the output signal of the second microcomputer, said second displaying means being arranged in the remote controller.

5. An air conditioner according to claim 1 or 4, wherein said remote controller comprises the key input circuit section for inputting the user's instruction, the second signal receiving circuit section for receiving the circuit conditions and the operating state signals of the sensor circuit sections determined by the first microcomputer arranged in the indoor machinery from the transmitting circuit section, the second microcomputer for receiving the output signals of the key input circuit section and the second signal receiving circuit section and determining the circuit conditions and the operating states of the indoor and outdoor machinery, an LCD display section for displaying in characters or symbols the output signal of said second microcomputer, and the second transmitting circuit section for transmitting the input instruction of the key input circuit section under the control of said second microcomputer.

6. An air conditioner according to claim 1, wherein said indoor machinery comprises the second sensor circuit section for sensing the actual operating state and the circuit condition of the air conditioner, the operative state sensing section for sensing the output signals relative to the state of an air conditioner from the first sensor circuit section arranged in the outdoor machinery and said second sensor circuit section, the first microcomputer for determining the circuit conditions and operating states of the sensor circuit sections in the indoor and outdoor machinery according to the output signals of said operative state sensing section, the first displaying section for displaying the circuit condition and operating state determined by said first microcomputer, a signal transmitting circuit section for transmitting a signal so as to display the circuit condition and operating states determined by said first microcomputer on the second displaying section of a remote controller, and a receiving circuit section for receiving the transmitted signal from the transmitting circuit section arranged in said remote controller and inputting user's instruction signal to the first microcomputer.

* * * * *